(12) United States Patent  
McCall

(10) Patent No.: US 6,170,849 B1
(45) Date of Patent: Jan. 9, 2001

(54) MCCALL AIR RIDE 5TH WHEEL HITCH SYSTEM

(76) Inventor: Eugene L. McCall, P.O. Box 287, Columbus, NM (US) 88029

( * ) Notice: Under 35 U.S.C. 154(b), the term of this patent shall be extended for 0 days.

(21) Appl. No.: 09/222,181

(22) Filed: Dec. 29, 1998

(51) Int. Cl.$^7$ .................................................. B62D 53/06
(52) U.S. Cl. ........................ 280/433; 280/438.1; 280/439
(58) Field of Search ............................ 280/433, 438.1, 280/439, 440, 441, 441.1, 901; 254/DIG. 4

(56) References Cited

U.S. PATENT DOCUMENTS

| | | | |
|---|---|---|---|
| 3,092,399 | * | 6/1963 | Hair ..................................... 280/438 |
| 3,253,840 | * | 5/1966 | Granning ............................. 280/425 |
| 3,380,758 | * | 4/1968 | Granning ............................. 280/425 |
| 4,279,430 | * | 7/1981 | Tagg et al. ........................... 280/439 |
| 4,580,806 | * | 4/1986 | Kolstad et al. ....................... 280/407 |
| 4,861,060 | * | 8/1989 | Schult et al. ......................... 280/439 |
| 5,203,850 | * | 4/1993 | Harrold ............................. 280/438.1 |
| 5,226,675 | * | 7/1993 | Noah et al. .......................... 280/439 |
| 5,328,198 | * | 7/1994 | Adams .................................. 280/439 |
| 5,330,222 | * | 7/1994 | Halverson et al. ................ 280/438.1 |
| 5,388,849 | * | 2/1995 | Arsenault et al. ................. 280/425.1 |
| 5,639,106 | * | 6/1997 | Vitale et al. .......................... 280/407 |
| 5,785,341 | * | 7/1998 | Fenton ................................. 280/441 |
| 5,851,021 | * | 12/1998 | Van Kley ......................... 280/438.1 |
| 5,964,476 | * | 10/1999 | Maines ................................. 280/433 |

* cited by examiner

Primary Examiner—J. J. Swann
Assistant Examiner—J. Allen Shriver

(57) ABSTRACT

An articulated air suspended hydraulic-dampened fifth wheel hitch coupling device for isolating the front of a fifth wheel or goose neck trailer hitch from the shock of bumps in the road and the inertia of movement of the trailer. Two inflatable air springs operatively connected to the pressurized air system of the tow vehicle eliminates vertical fifth wheel load from being transferred from the trailer to the tow vehicle. Additionally, an oscillating rocker connected transversely to the direction of travel of the vehicle allows the fifth wheel hitch to pivot in a transverse motion to eliminate load from being transferred from the trailer to the tow vehicle.

1 Claim, 3 Drawing Sheets

MCCALL AIR RIDE 5TH WHEEL HITCH SYSTEM

The file of this patent contains at least one color photograph. Copies of the patent with color photos will be provided by the PTO upon payment of necessary fee.

BACKGROUND

1. Field of Invention

This invention relates to the hitches used to attach 5th wheel trailers/recreational vehicles to various types of tow vehicles.

2. Description of Prior Art

Many types of hitches and hitch systems are commonly supplied by various manufacturers to securely attach 5th wheel or goose neck trailer to tow vehicles. These hitches are manufactured and supplied in several load ranges to accommodate the weight and load to be towed. Several safety features are incorporated to assure a secure and safe locking device.

Originally all hitches were mounted rigidly to the frame of the tow vehicle following the practice of hitching commercial semi-trailers to commercial tractors. The major difference between commercial hitches and recreational vehicle hitches was in size. One problem arose from the failure to consider the differing operating conditions. Commercial trailers and tractors operate almost entirely on surfaces with the trailer and tractor on the same plane. Recreational vehicles frequently need to be leveled when parked by raising one side of the trailer leaving the tow vehicle on an unlevel surface. The result is a binding force in the hitch making it very difficult to unhook and hook up the two vehicles.

A further problem resulted from the failure to consider how the weight and spring load of the tow vehicle would effect the trailer and its contents. This has resulted in numerous cases of broken contents of the trailer and broken front frames on 5th wheel trailers. The trend to heavier 5th wheel trailers which need to be towed by larger trucks has increased the severity of the problem because until now there was no hitch or hitch system designed to address the problems.

OBJECTS AND ADVANTAGES

Accordingly, several objects of my hitch system are as follows. Previously designed hitch systems did not provide a means to protect the trailer or its contents from shock damage due to roughness of road surfaces and resulting bounce and movement. Neither did they provide a safe locking device. My hitch system encompasses all these and several other advantages.

My system uses a totally articulated hitch plate which allows the tow truck and trailer to move in a more flexible manner. This protects the hitch pin and its related box and frame assembly from the stresses incurred by the tow vehicle when operating on unlevel surfaces.

Other manufacturers attempt to cover weight variations of trailers by building several different hitches with different weight ratings. This causes confusion among prospective owners who fail to understand the difference in the ratings and results in serious mismatching of hitch system and trailer weights. My hitch system overcomes this problem by being manufactured in one size. My hitch system has been static tested to 45,000 pounds and the hitch assembly itself is rated to 25,000 pounds, far in excess of most hitches supplied by other manufacturers and in excess of any existing demands. This allows changes from one trailer to another without concern for safety ratings.

My hitch system also incorporates a hinged platform (see FIG. 1) that the hitch itself is mounted on which is supported by heavy duty air bags which are further stabilized by shock dampening devices. This combination results in a firm but soft ride preventing damage to the trailer and its contents.

SUMMARY

As is the case with many devices, 5th hitch development for recreational vehicles has been based on similar but different products already in existence. Large commercial semi-trailers and tractors have long used what has come to be known as a 5th wheel hitch. For commercial use these devices are designed and built to carry a weight load of thousands of pounds and in some instances tow over 100,000 pounds. These 5th hitches are made to allow a small amount of pitching motion front to rear to accommodate the normal unevenness in road surfaces. No allowance is made to accommodate the side to side rolling motion frequently met by recreational vehicles.

Further, commercial 5th hitches were unnecessarily large for 5th recreational vehicles which rarely weigh more than 20,000 pounds. Design of recreational vehicle 5th hitches simply followed the pattern of start with a huge commercial hitch and scale it down in size.

This method of design has worked fairly well until the recent trend toward larger and heavier 5th wheel recreational vehicles. As long as the 5th wheel recreational vehicles did not exceed approximately 12,000 pounds they could be towed by properly equipped pickup trucks. The trend toward heavier 5th wheel recreational vehicles has resulted in the need for larger and heavier tow trucks. Many owners and truck converters have begun using medium duty or larger trucks. One problem that has resulted comes from the fact that these trucks have stiffer suspension systems and much more weight than the previously used pickup trucks. The stiffer springs and increased inertia of these larger trucks has resulted in a rough ride for the trailer and its contents. There have been numerous instances in which the front frame of the 5th wheel trailer has broken. My hitch system solves all of these problems by isolating the trailer from the inertial weight of the truck and its stiffer springs using air bags and carefully designed hinge arms. The 5th wheel recreational vehicle floats on a cushion of air with my hitch system.

BRIEF DESCRIPTION OF THE DRAWINGS

The invention will be better understood by reference to the accompanying drawings, wherein.

DESCRIPTION OF THE PREFERRED EMBODIMENT

Figure 1:
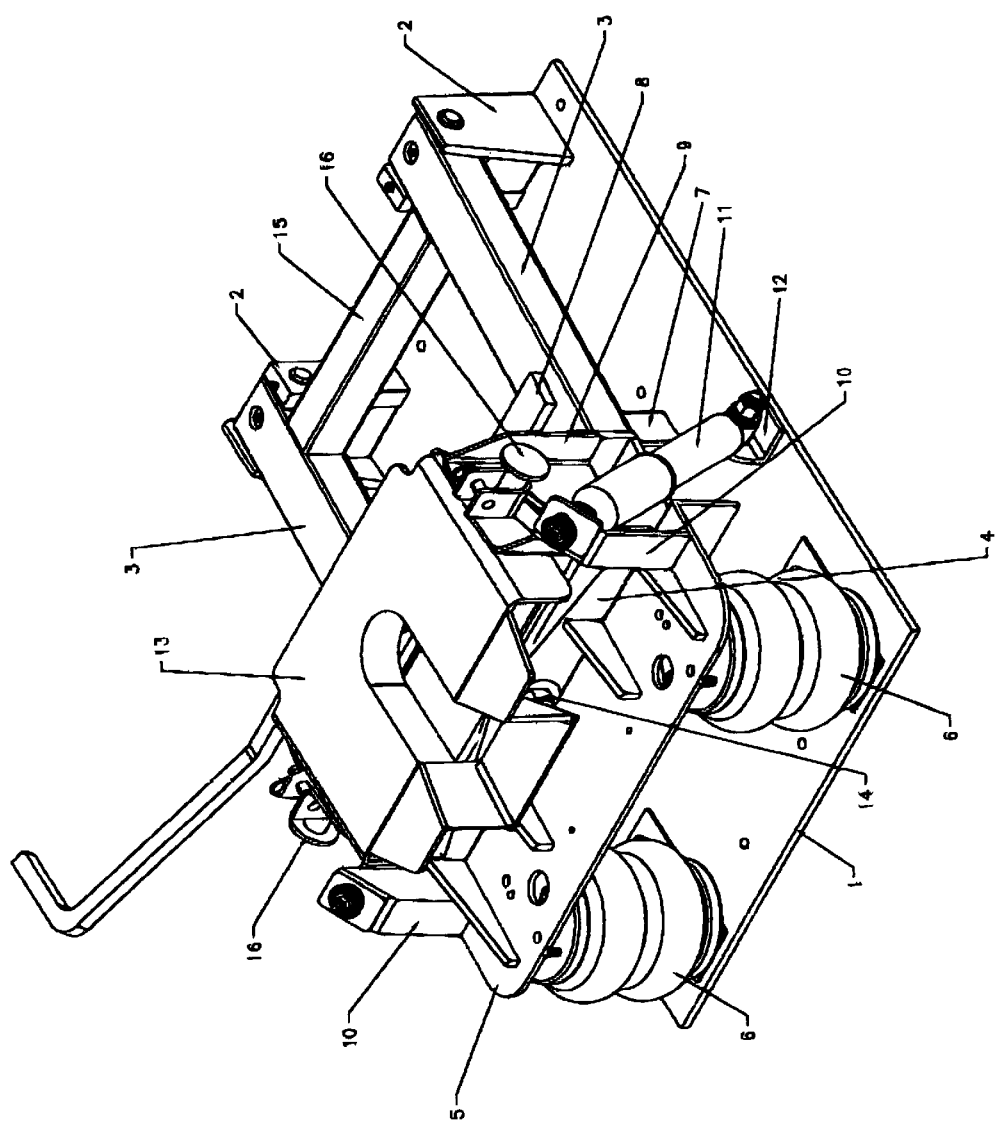
FIG. 1 is a perspective view from the front side of the preferred embodiment of the air ride $5^{th}$ wheel hitch system.
Figure 2:
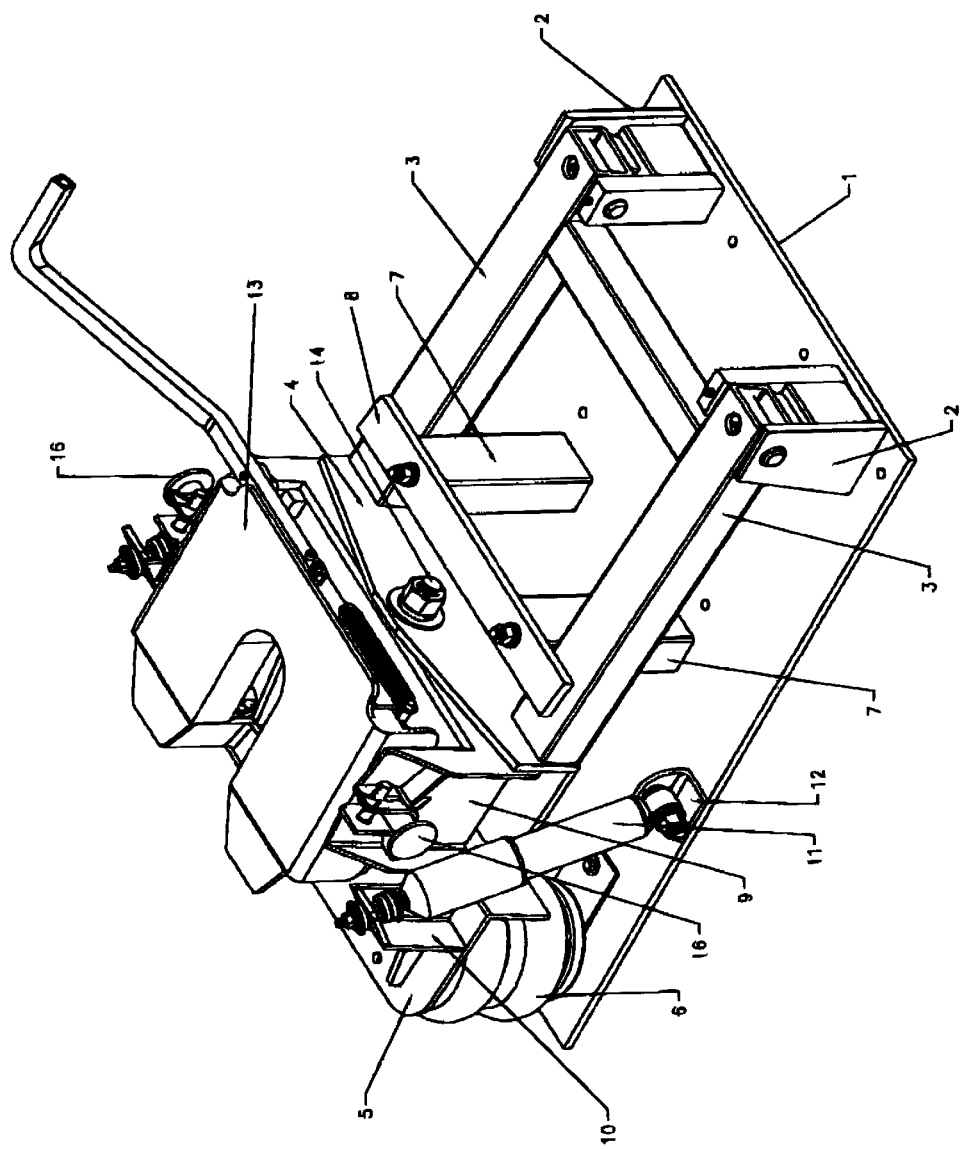
FIG. 2 is a perspective view from the rear side of the preferred embodiment of the air ride $5^{th}$ wheel hitch system illustrated in FIG. 1.
Figure 4:
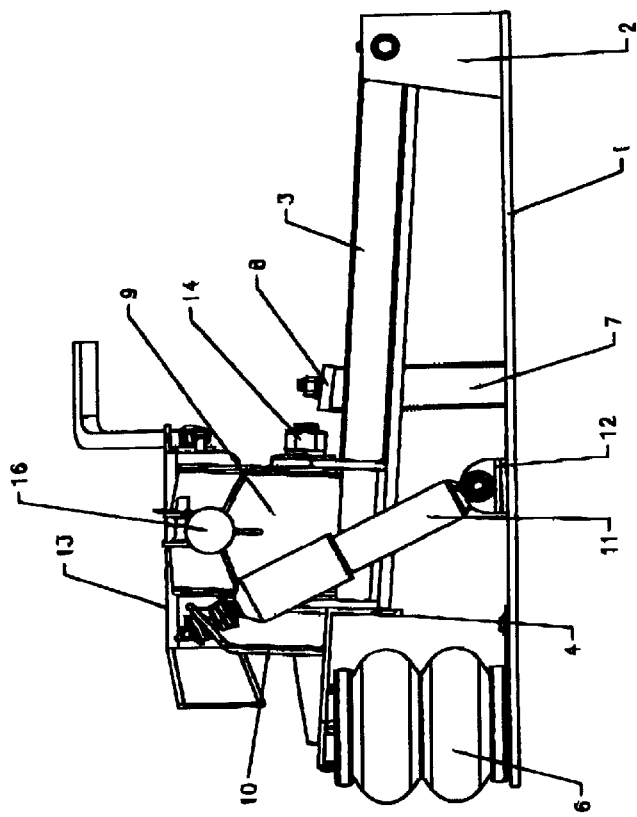
FIG. 4 is a side view of the air ride $5^{th}$ wheel hitch illustrated in FIG. 1.
Figure 3:
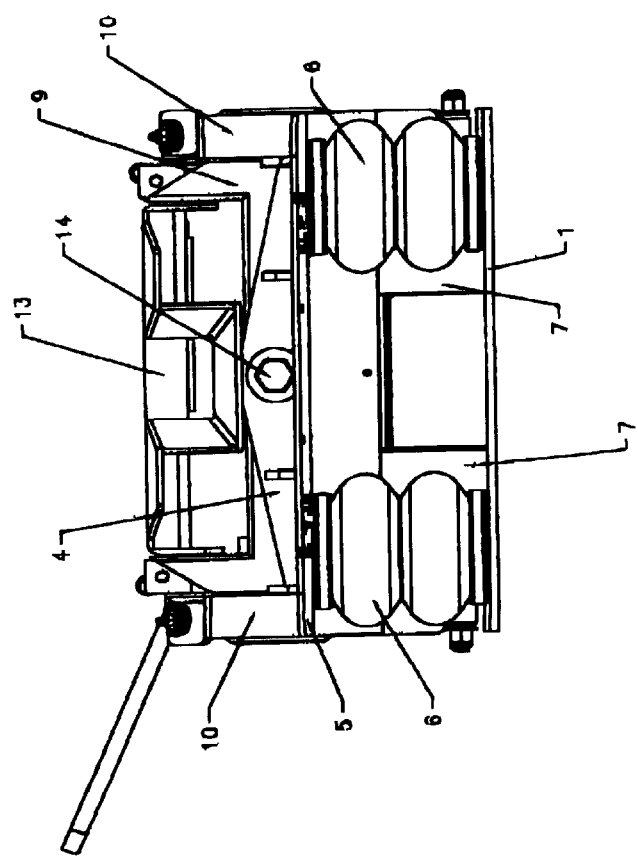
FIG. 3 is a front view of the air ride $5^{th}$ wheel hitch illustrated in FIG. 1.

The air ride $5^{th}$ wheel hitch system includes a rectangular base plate 1 that is mountable to the tow vehicle. Located at the front end of the base plate 1 are two hinge blocks 2, which are fastened to the base plate. The front end of the base plate 1 corresponds to the front end of the tow vehicle. The front end of two hinge arms 3 are pivotally mounted to the hinge blocks 2, and run longitudinal to the direction of travel of the tow vehicle. Front hinge arm support brace 15 spans and connects the hinge arms 3 just behind the hinge blocks 2. The rear end of the two hinge arms 3 are connected to a u-shaped cradle 4, wherein the channel of the u-shaped cradle 4 runs transverse to the direction of travel of the tow vehicle. In front of the u-shaped cradle 4 and located inside the hinge arms 3 are two vertical support posts 7 that are fixedly connected to the base plate 1. A retaining bar 8 spans traverse to the direction of the tow vehicle across the top of the two vertical support posts 7. The retaining bar 8 is fixedly connected to the vertical support posts 7 by bolt fasteners. The retaining bar 8 limits the vertical travel of the hinge arms 3. Located on the rear side of the u-shaped cradle 4 is the air bag mount plate 5. This air bag mount plate 5 maybe welded or fastened with bolts to the u-shaped cradle-4. Two air springs 6 are mounted between the air bag mount plate 5 and the rear end of the base plate 1. A control value assembly (not shown) is operatively connected to the air springs 6 to facilitate height adjustment of the air ride $5^{th}$ wheel hitch assembly, utilizing pressurized air from the tow vehicle's air system. Pivotally mounted inside the u-shaped cradle 4 is an oscillating rocker 9. The oscillating rocker 9 is pivotally mounted to the u-shaped cradle 4 by a one inch rocker pin 14 that runs longitudinal to the direction of travel of the tow vehicle. This connection allows the oscillating rocker 9 to pivot transversely to the direction of the travel of the tow vehicle. The oscillating rocker 9 is formed from a bottom u-shaped channel that runs transverse to the direction of travel of the tow vehicle and two vertical end sections. Located on the two vertical end sections of the oscillating rocker 9 are two mounting pins 16 for rotatably mounting the fifth wheel hitch plate 13 above the oscillating rocker 9. This connection permits the fifth wheel hitch plate 13 to pivot in a longitudinal direction in relation to the direction of travel of the tow vehicle. Shock absorbers 11 are mounted to the air ride $5^{th}$ wheel hitch assembly between lower shock absorber brackets 12 attached to the base plate 1 and vertical shock absorber mounting posts 10 attached to the sides of the air bag mounts 5. It will be appreciated by those skilled in the art, the air ride $5^{th}$ wheel hitch system provides an additional convenient and effective mechanical expedient for cushioning road shock between the tow vehicle and trailer. It will be further appreciated that variations may be made in the design of the air ride $5^{th}$ wheel hitch system frame in terms of width, length and materials of construction, depending upon necessary strength requirements based on the weight of the trailer being towed.

In operation the hitch pin of the trailer is attached to the base plate of the hitch assembly (FIG. 1, part 9) by the hitch assembly's own latch system. (A hitch assembly is covered under another patent). When the weight of the front part of the trailer, called the pin weight, is transferred to the hitch assembly the assembly is forced down. Compressed air pressure is introduced into the air bags (FIG. 1, part 6) until the pin weight is carried by the air bags. Pressure is adjusted to carry the pin weight at approximately the mid point of movement of the hinge arms (FIG. 1, part 3).

As the truck and trailer move down a road the trailer is impacted by several forces such as bumps in the road, wind currents from passing traffic, and maneuvers made by the driver. Some of these forces induce a vertical up and down motion by the front of the trailer. When the front of the trailer tries to move up or down with a conventional fifth wheel hitch assembly the trailer must first overcome the inertia of the rear of the truck including any cargo it may be carrying in storage compartments. This weight may be 4000 pounds or more. Overcoming inertia imposes very heavy forces on the front trailer frame.

Also, with a conventional hitch assembly any movement in a vertical direction by the truck in response to bumps in the road are forced on the front trailer frame. These forces have broken trailer frames for many owners.

With my hitch assembly the front of the trailer rides on an air cushion. In tests with several trailers it was found that with some trailers pressure in air bags may be as little as 35 pounds per square inch. This air cushion gives a trailer frame a soft and safe ride.

While the preferred embodiment of the invention has been described above, it will be recognized and understood that various modifications may be made in the invention and the appended Claim is intended to cover all such modifications which may fall within the spirit and scope of the invention.

CONCLUSION, RAMIFICATIONS, AND SCOPE

Thus the reader will note that my hitch system offers protection against broken frames and broken cargo within a trailer. It is simple to operate and adjust by simply noting the air pressure in a gauge and adjusting to the pressure found sufficient for the ride desired.

This description is not intended to be limiting with respect to dimensions or construction materials. For example, the length of the hinge arms or their construction can vary according to the results desired. It is also possible that future development of materials will make it desirable to change materials from those mentioned in the description.

Having described my invention with the particularly set forth above, what is claimed is:

1. An articulated air suspended hydraulic-dampened coupling device which permits a trailer to move in a vertical motion without transferring motion to a towing vehicle, while also permitting the trailer to move in a transverse motion due to the attachment of a fifth-wheel articulated hitch plate in such a way as to permit a gimbaled effect resulting in relieving all stress from the trailer and inhibiting the torque transferred from the tow vehicle to the trailer, the articulated air suspended hydraulic-dampened coupling device comprising of:

a mounting base plate for attachment to the rear section of said towing vehicle;

a hinged frame assembly pivotally attached to the front of said mounting base plate and supported at the rear of said mounting base plate by two air springs attached to the rear of said mounting base plate;

a unshaped cradle assembly fixedly attached to said hinged frame assembly, wherein said unshaped cradle assembly is positioned transverse to said hinged frame assembly;

a unshaped oscillating rocker is located within and pivotally connected to said cradle assembly by a pin, wherein said oscillating rocker is positioned longitudinally to said hinged frame assembly so that said oscillating rocker can pivot transversely with respect to said hinged frame assembly;

a fifth-wheel articulated hitch plate is pivotally mounted on the top of said oscillating rocker for attaching said trailer to said tow vehicle, wherein the hitch plate can pivot longitudinally with respect to said hinged frame assembly;

a pair of gas/hydraulic shock absorbing devices are located on both sides of said mounting base plate and mounted between the rear of said hinged frame assembly and the middle of said mounting base plate;

a pair of vertical support posts welded inside said hinged frame assembly at a position forward of said cradle assembly to eliminate side thrust;

a retaining bar mounted on top and between said vertical support posts to restrict the vertical movement of said hinged frame assembly to a pre-determined height; and a control value assembly is operatively connected to said air springs to facilitate height adjustment of said hinged frame assembly, utilizing pressurized air from said tow vehicle's air system.

* * * * *